Feb. 17, 1970　　W. A. AIKINS　　3,495,534
SPIRAL SCREW METERING AND PROPORTIONING PUMP
Filed July 31, 1967　　3 Sheets-Sheet 1
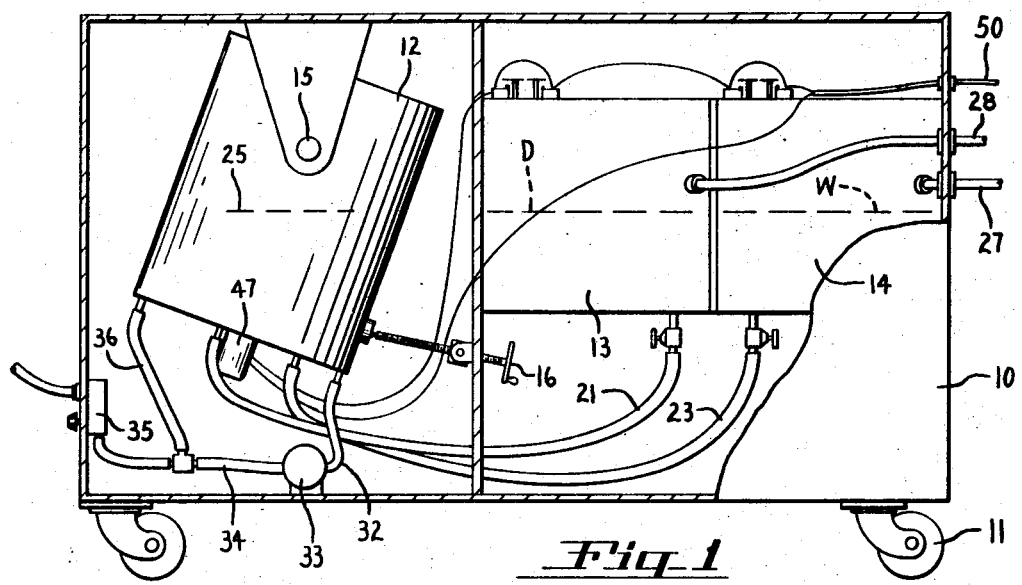
Fig. 1
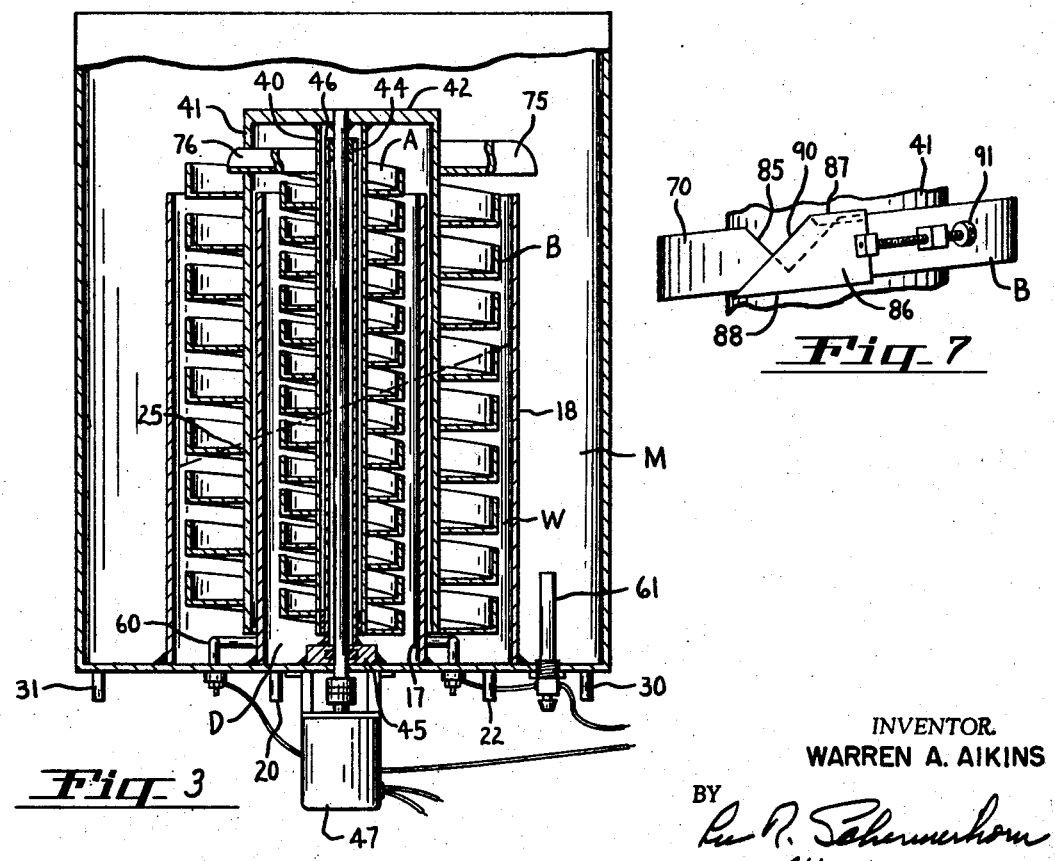
Fig. 3
Fig. 7
INVENTOR.
WARREN A. AIKINS
BY
Attorney

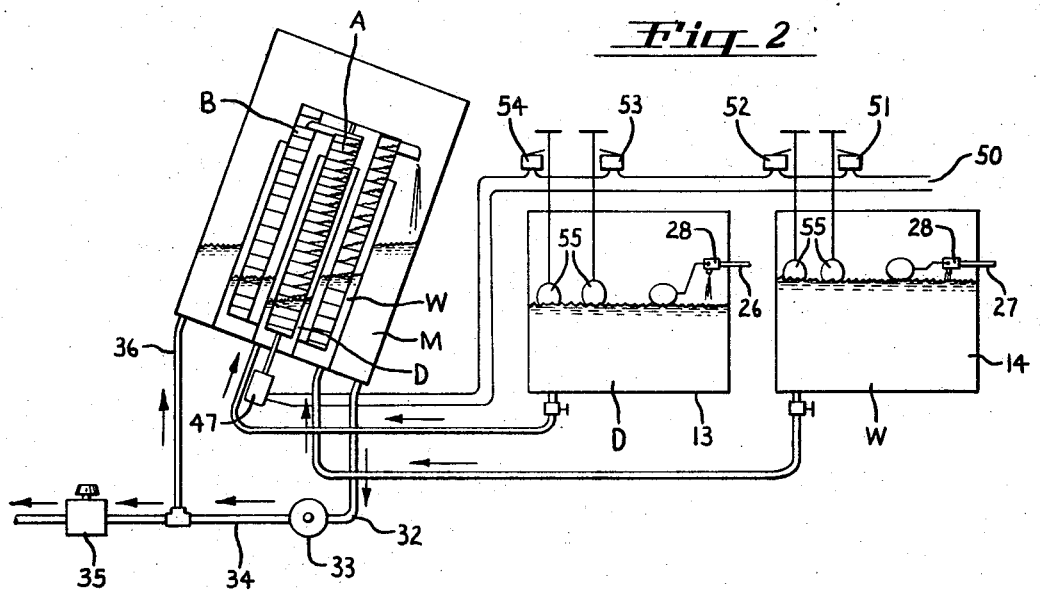
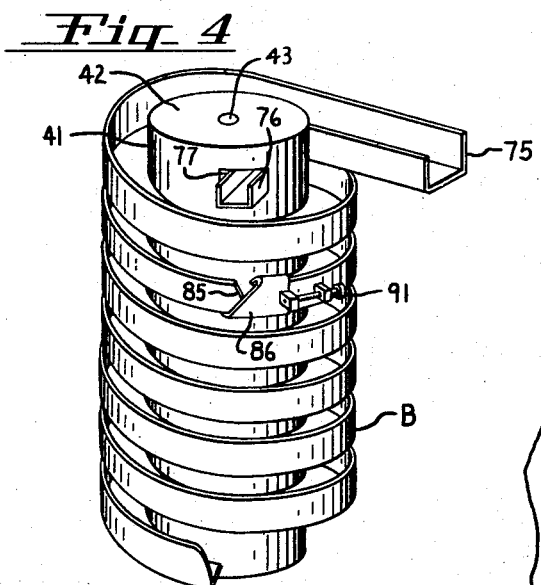
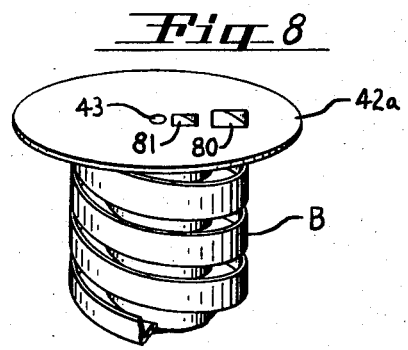
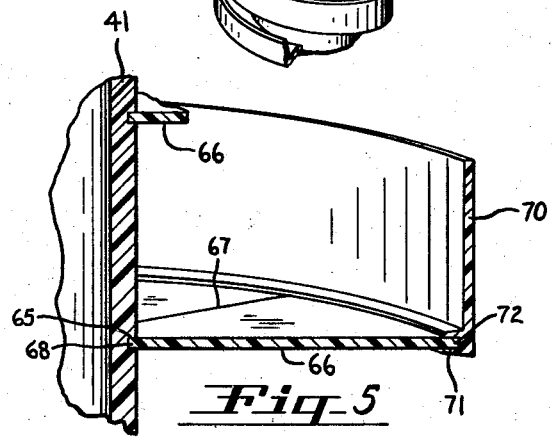
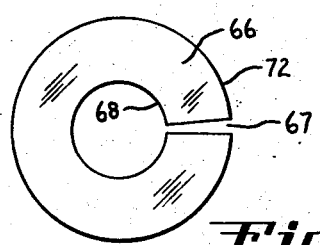
INVENTOR.
WARREN A. AIKINS

Feb. 17, 1970     W. A. AIKINS     3,495,534
SPIRAL SCREW METERING AND PROPORTIONING PUMP
Filed July 31, 1967     3 Sheets-Sheet 3
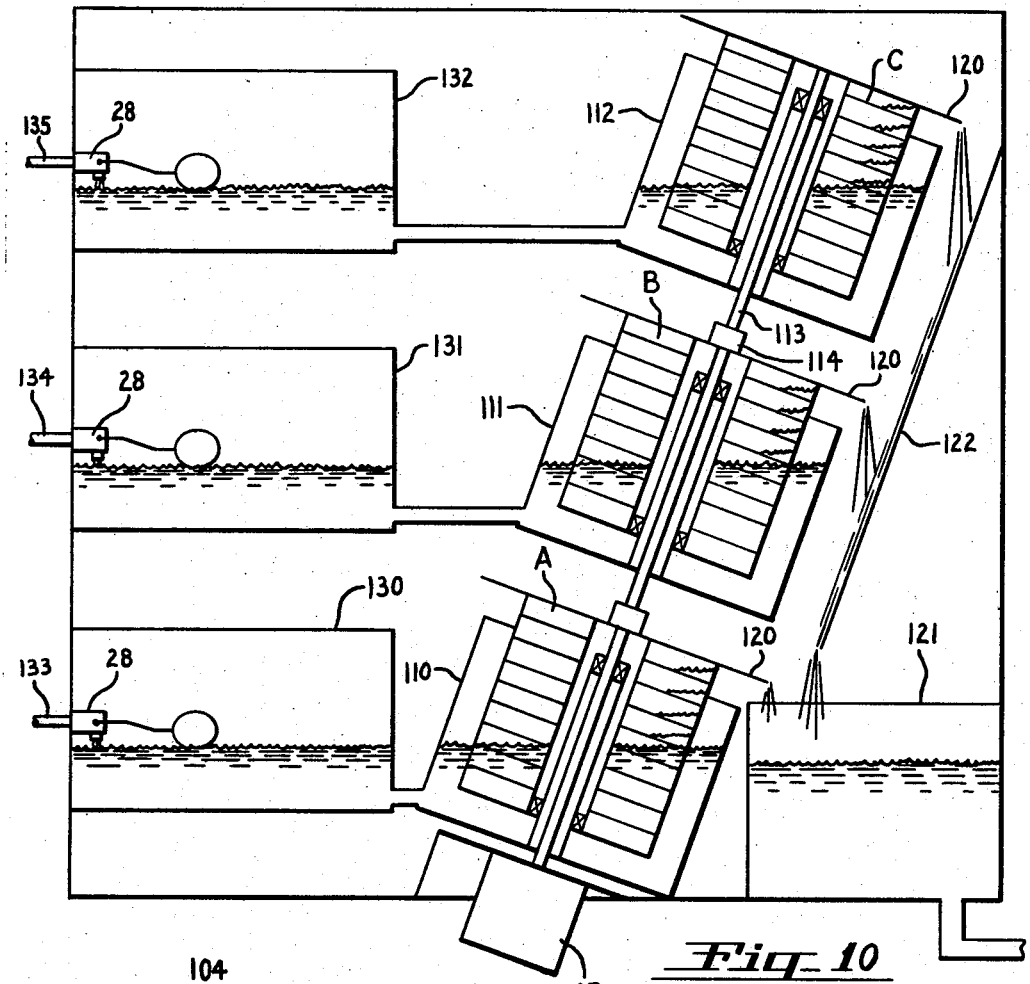
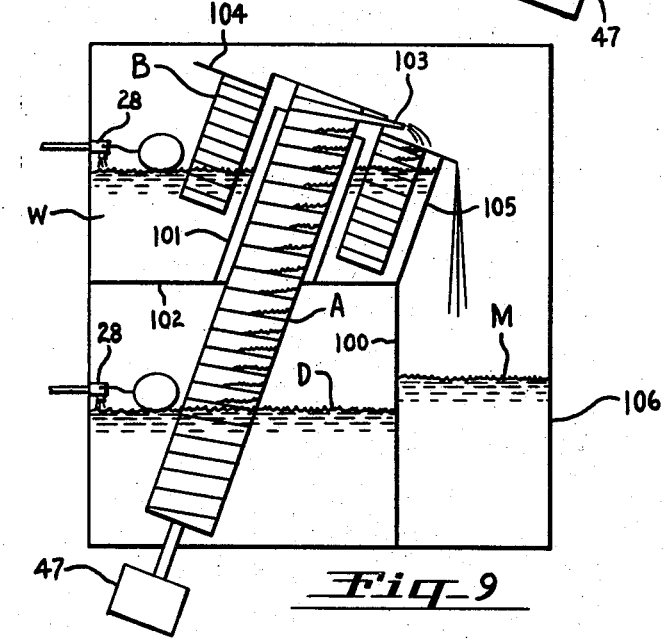
INVENTOR.
WARREN A. AIKINS
BY
Lee R. Schermerhorn
Attorney

United States Patent Office 3,495,534
Patented Feb. 17, 1970

3,495,534
SPIRAL SCREW METERING AND PROPORTIONING PUMP
Warren A. Aikins, 3489 Indian Creek Drive,
Longview, Wash. 98632
Filed July 31, 1967, Ser. No. 657,256
Int. Cl. F04b *13/02, 19/06;* F04d *3/02*
U.S. Cl. 103—6                                   20 Claims

ABSTRACT OF THE DISCLOSURE

A plurality of coaxial spiral troughs arranged one within another or end to end for rotation on a common shaft to pump different liquids in different proportions. The output of one or more of the troughs is metered by an adjustable V-notch weir which spills back a portion of the liquid in each revolution. The output or ratio may also be varied by tilting the axis of rotation at different angles. Mechanical failure does not alter proportioning.

BACKGROUND OF THE INVENTION

This invention relates to a devise for proportioning two or more liquids which are to be mixed with a high degree of accuracy. It has particular reference to the preparation of liquid for use in an artificial kidney where a prepared dialysate concentrate is mixed with water as, for example, in the ratio of about 1 to 30.

Present devices for this purpose have complicated pump and mixing valve arrangements which are subject to failure, often with fatal results to the patient. If the desired proportioning is not maintained or if the pump or valve failure should cause either water or concentrate alone to be fed to the dialysis machine, the result may be fatal to the patient. However, if the mixture flows too fast or too slowly or if the flow of mixture stops, no harm is done.

SUMMARY OF THE INVENTION

The present device comprises two or more spiral troughs mounted for rotation on a common motor diven shaft. The lower ends of these troughs are immersed in separate tanks of the liquids which are to be mixed. Rotation of the spiral troughs elevates the liquids and discharges them together into a mixture tank.

This arrangement requires no pump valves and is substantially incapable of any type of failure which could harm the patient. As long as the supply tanks contain the liquids to be mixed, these liquids will be pumped in predetermined ratio. The pumping of one liquid cannot stop while the other continues. The pumping ratio may be varied by an adjustable V-notch weir in at least one of the spiral troughs which spills back a portion of one of the pumped liquids so that the desired amount is discharged into the mixture tank. Also, tilting the axis of rotation at different angles will vary the spillage from the V-notch. With a tilting adjustment, the V-notch does not necessarily have to be adjustable.

Objects of the invention are to provide an improved proportioning device for mixing liquids, to provide a plurality of pumps which will faithfully maintain over a long period of time a predetermined ratio between two or more pumped liquids, to provide pumps without valves for the purpose described, to provide a plurality of pumps on a common shaft so that one cannot stop while the others continue to run, and to provide pumps having rotary spiral troughs wherein the flow is regulated by an adjustable V-notch weir in the side of one of the troughs or by tilting the axis of rotation at different angles.

The invention will be better understood and additional objects and advantages will become apparent from the following description of certain preferred embodiments illustrated in the accompanying drawings. Various changes may be made in the details of construction and arrangement of parts and certain features may be used without others.

BRIEF DESCRIPTION OF THE DRAWINGS

FIGURE 1 is a side elevation view, with parts broken away, of a first embodiment of the invention;

FIGURE 2 is a schematic diagram of the device in FIGURE 1;

FIGURE 3 is an enlarged vertical sectional view of the metering screws in FIGURE 2;

FIGURE 4 is a perspective view of the metering screws in FIGURE 3;

FIGURE 5 is a fragmentary enlarged sectional view showing a detail of construction in FIGURE 4;

FIGURE 6 is a plan view of an element which forms the trough bottom plate in FIGURE 5;

FIGURE 7 is a fragmentary elevation view showing the adjustable V-notch weir in FIGURE 4;

FIGURE 8 is a fragmentary perspective view of a modification showing a different discharge arrangement for the metering screws;

FIGURE 9 is a diagrammatic view of a modification for mixing two liquids; and

FIGURE 10 is a diagrammatic view of a modification for mixing three liquids.

DESCRIPTION OF THE PREFERRED EMBODIMENTS

The apparatus in FIGURE 1 is contained in a portable cabinet 10 mounted on caster wheels 11. Cabinet 10 contains a mixing tank 12, a supply tank 13 for the dialysate concentrate D and a supply tank 14 for water W. Mixing tank 12 is supported on horizontal pivots 15 so that the tank may be tilted by adjusting screw 16.

As seen in FIGURE 3, the tank 12 is divided into three concentric chambers by two cylindrical upstanding partition walls 17 and 18. The wall 17 encloses a dialysate concentrate chamber as indicated by dialysate D. The annular space between walls 17 and 18 provides a water chamber as indicated by water W. The space between wall 18 and the wall of tank 12 provides a mixture chamber as indicated by mixture M.

The bottom of dialysate chamber D is provided with a hose connection 20 for a flexible hose 21 which is connected with the bottom of the dialysate supply tank 13. The bottom of water chamber W is provided with a hose connection 22 for a flexible hose 23 which is connected with the bottom of water supply tank 14. These hose connections maintain liquid levels in chambers D and W in FIGURE 3 corresponding to the liquid levels in supply tanks 13 and 14. The broken line 25 in FIGURE 3 indicates the common liquid level in chambers D and W when tank 12 is tilted as shown in FIGURE 1, assuming that the liquid level is the same in both supply tanks 13 and 14. It is to be understood, of course, that the liquid level does not have to be the same in both supply tanks. Supply tank 13 is supplied by an inlet pipe 26 and tank 14 is supplied by an inlet pipe 27. Constant liquid levels are maintained in these tanks by inlet float valves 28 as shown in FIGURE 2.

Referring back to FIGURE 3, the mixture chamber M is provided on opposite sides of its bottom with hose connections 30 and 31. A flexible hose 32 extends from connection 30 to the inlet of a pump 33 as shown in FIGURES 1 and 2. The pump discharges through an outlet hose 34 and adjustable flow metering valve 35 to supply the dialysis machine or artificial kidney. A circulation bypass hose 36 is connected between discharge hose 34 and mixing chamber connection 31 to re-circulate a portion of the mixture M depending upon the adjustment of valve 35.

Chamber D in FIGURE 3 contains a spiral trough metering screw A and chamber W contains a concentric spiral trough metering screw B. Trough A is mounted on a cylinder 40 and trough B is mounted on a cylinder 41. The upper ends of both cylinders are mounted on a circular supporting plate 42 which is fixedly connected with a drive shaft 43. Shaft 43 is mounted for rotation in an upper bearing 44 and a lower bearing 45 and is contained in a tube 46 which is mounted on lower bearing 45 or the bottom of tank 12. Bearing 44 is mounted in tube 46. Thus, the chamber D is also of annular shape extending between tube 46 and cylindrical wall 17. Shaft 43 is rotated by electric motor 47.

Motor 47 is energized from the supply circuit 50 in FIGURE 2. This circuit is completed through four float switches 51 to 54 in series. These are normally closed switches which are arranged to be opened by the four floats 55 if the liquid supply should drop to a dangerously low level in either tank 13 or 14. In such event, the motor 47 is deenergized to stop the metering screw pumps A and B. As a safety precaution, there are two separate float switches and floats in each supply tank so that if one should fail to operate, the other will perform the intended function.

The concentric arrangement of the three chambers D, W and M in FIGURE 3 allows a convenient arrangement of temperature control for the mixture. The water chamber W is equipped with an arcuate electric heating unit 60 and the mixture chamber M is equipped with a thermostatic control switch 61 in circuit with the heating unit. Thus, the intermediate chamber W is heated directly by unit 60 and the central and outer chambers D and M receive heat from chamber W with the control element being in the outer chamber to maintain constant temperature in the mixture discharged therefrom. Heating unit 60 may be mounted in chamber W by any suitable means.

The two metering screws A and B are of similar construction as shown in FIGURE 5 wherein the supporting cylinder 41 may be considered to designate either one of the cylinders 40 or 41 in FIGURE 3. Each supporting cylinder 40 and 41 is provided with a spiral groove 65. The bottom of the spiral trough is formed by a series of flat annular members 66 which are split on radial lines 67 as shown in FIGURE 6. A plurality of the members 66 are twisted into helical configuration so that their inner edges 68 will fit in grooves 65 with the cut edge 67 of one member abutting the corresponding edge of the adjacent member to form a continuous screw. The wall of the trough comprises a continuous flat strip 70 having a groove 71 formed along its lower edge to receive the outer edge 72 of the members 66. The parts 41, 66 and 70 are described as made of plastic but they may be made of stainless steel for hot water sterilization.

In assembling the screw, when the parts are made of plastic, the members 66 are cemented in groove 65 one after another and the joints at edges 67 are cemented together. Then the strip 70 is wound progressively around the resulting helix, cementing the joint 71, 72 as the winding progresses.

The outer trough B is equipped with a discharge spout 75 as shown in FIGURE 4. The upper end of inner trough A is equipped with a similar discharge spout 76 which projects through an opening 77 in the cylinder 41. Thus, trough A discharges into the uppermost turn of trough B and spout 75 overhangs the wall 18 to discharge the mixture into the chamber M in FIGURE 3. The discharge ratio is controlled by varying the inclination of tank 12 on its pivot 15 by means of adjusting screw 16 in FIGURE 1.

An alternative discharge arrangement is shown in FIGURE 8. Here, the top supporting plate 42a has a larger diameter so as to overhang the outer trough B. The outer trough B discharges through an opening 80 in this plate and the inner trough A discharges through an opening 81. The plate forms a drip ring which overhangs wall 18 and drips into chamber M in FIGURE 3.

By elongating the openings 80 and 81 in a circumferential direction and tapering the outside walls of the troughs in their topmost turns, the two flows may be made almost continuous, if desired, instead of dumping all the liquids in the top turns in just a portion of each revolution.

Novel means for adjusting the ratio of the liquids in the mixture is shown in FIGURES 4 and 7. Wall 70 of outer trough B is provided with a V-notch weir 85 to spill a portion of the water back into chamber W in FIGURE 3. For this purpose, the upper edge of wall 18 just clears the under side of spout 75 and the V-notch 85 is formed at a level slightly below the top of wall 18. The weir is provided with an arcuate plate 86 having its upper and lower edges 87 and 88 bent to form guides for sliding movement on strip 70. Plate 86 has a sloping edge which may be moved to different positions in notch 85 by adjusting screw 91.

Since the flow characteristics of V-notch weirs are well established, it is a simple matter to calibrate the adjustment of sliding plate 86, if desired. It is not necessary, however, to maintain a liquid-tight joint between adjusting plate 86 and the trough wall 70. Even though there may be leakage in this sliding joint, the leakage is the same in each revolution whereby the pumping action faithfully repeats and the output rate of spout 75 remains constant.

Other equivalent means may be provided, if desired, for adjusting the spillage. For example, the trough bottom 66 may be raised or lowered relative to side wall 70.

The combination of V-notch adjustment 91 and tilt adjustment 16 provides for a wide variation in the ratio of the two liquid flows, the latter having the advantage of being adjustable while the device is operating. For some purposes the tilt control 16 provides sufficient variation by itself, in which case the V-notch 85 may be non-adjustable.

FIGURE 9 shows a more compact arrangement wherein the two metering screws A and B operate directly in their respective float controlled supply tanks in stacked position. In this arrangement the metering screw A is elongated so that its lower end extends into a dialysate tank 100 while its upper end extends within a cylindrical wall 101 in a water tank 102 directly above the dialysate tank. The inner screw A discharges from a spout 103 onto a circular drip plate 104 which overhangs a wall 105 of tank 102. Outer screw B discharges through an opening in drip plate 104 as shown at 80 in FIGURE 8 whereby the two flows discharge from drip plate 104 into mixture tank 106. Metering screw B is equipped with an adjustable V-notch weir as shown in FIGURE 7.

FIGURE 10 shows how the principles of the invention may be applied for proportioning and mixing any number of liquids. In this case there are three metering screws A, B and C in axial alignment in the three tanks 110, 111 and 112. The individual shafts 113 of the three screws are coupled together at 114 for rotation by the common drive motor 47. Each screw is equipped with a separate drip plate 120 similar to the drip plate 104 in FIGURE 9 for discharge into a mixture tank 121. A guide trough 122 may be provided to convey the discharge from the upper screws. Each screw A, B and C is equipped with an adjustable V-notch weir as shown in FIGURE 7 arranged to spill a portion of the pumped liquid back into the respective screw tanks 110, 111 and 112. It is, of course, understood that the supply tanks in FIGURES 9 and 10 may also be equipped with float switches as shown in FIGURE 2 to stop the motor 47 if the liquid level in any supply tank becomes dangerously low.

The liquid levels in screw tanks 110, 111 and 112 are maintained by float valves 28 in the respective supply tanks 130, 131 and 132 which are fed from the inlet pipes 133, 134 and 135.

The arrangement in FIGURE 10 is also useful for porportioning the flows of liquids which are not mixed together. For this purpose a separate receiving tank 121 is provided under each drip plate 120.

It is, of course, understood that some or all of the metering screws in FIGURES 9 and 10 may be equipped with fixed instead of adjustable V-notch weirs and that the angle of tilt may be made adjustable as indicated at 16 in FIGURE 1.

Having now described my invention and in what manner the same may be used, what I claim as new and desire to protect by Letters Patent is:

1. A device for metering the flow of a liquid comprising a supply reservoir for the liquid, a rotary, inclined spiral trough arranged to pump said liquid from said reservoir, a weir notch in the side of said trough arranged to spill a portion of the liquid out of said trough at an intermediate level in said spiral, and means to discharge the remaining liquid in said trough from the upper end of said spiral.

2. A device as defined in claim 1, said notch being V-shaped, and an adjustable sliding plate having a sloping edge forming one side of said notch for varying the amount of spillage.

3. A device for metering the flow of a liquid comprising a supply reservoir for the liquid, a rotary, inclined spiral trough arranged to pump said liquid from said reservoir, means arranged to spill a portion of the liquid out of said trough at an intermediate level in said spiral, means to discharge the remaining liquid in said trough from the upper end of said spiral, a second supply reservoir for a second liquid, a second spiral trough connected with said first spiral trough for rotation in unison therewith, said second spiral trough being arranged to pump liquid from said second reservoir whereby the flows of the two liquids are proportioned.

4. A device as defined in claim 3 including a mixture tank receiving the discharges of both of said spiral troughs.

5. A device as defined in claim 4, said second spiral trough being concentric within said first spiral trough.

6. A device as defined in claim 5, said supply reservoirs and mixture tank being disposed in concentric relation with each other.

7. A device as defined in claim 6, said second spiral trough being arranged to discharge into an upper portion of said first spiral trough and said first spiral trough being arranged to discharge the combined flows of both troughs into said mixture tank.

8. A device as defined in claim 6 including a drip plate on the upper ends of said spiral troughs arranged to discharge into said mixture tank, said drip plate having openings therein arranged to pass the flows from both spiral troughs to the upper side of the drip plate for said discharge into said mixture tank.

9. A device as defined in claim 5, said second supply reservoir being disposed beneath said first supply reservoir and said first reservoir having a circular wall defining an opening through the bottom thereof, said second spiral trough extending through said opening to said second supply reservoir.

10. A device as defined in claim 3, said spiral troughs and supply reservoirs being arranged one above the other in coaxial relationship.

11. A device for proportioning a mixture of component liquids comprising a pair of separate liquid chambers for different component liquids and a mixture chamber, and a pair of rotary inclined spiral troughs arranged to pump liquids from the respective liquid chambers and discharge said liquids into said mixture chamber, said spiral troughs being disposed in coaxial arrangement and rotated by a common coaxial drive shaft.

12. A device as defined in claim 11 including a tank, an upstanding partition wall in the bottom of said tank forming said mixture chamber as an outer chamber, and an upstanding cylindrical partition wall in the bottom of said tank forming central and intermediate chambers comprising said liquid chambers.

13. A device as defined in claim 12, said pair of troughs being mounted on a pair of concentric cylinders in the respective liquid chambers, and a top plate supporting said cylinders, said shaft being connected with said top plate for supporting and rotating said cylinders and troughs.

14. A device as defined in claim 11 including means for spilling a portion of the liquid from one of said spiral troughs to reduce the amount of liquid discharged therefrom into said mixing chamber.

15. A device as defined in claim 14, said spilling means comprising a weir in the side of the trough.

16. A device as defined in claim 15, said weir comprising a V-notch, and an adjustable sliding plate having a sloping edge forming one side of said notch to vary the amount of spillage.

17. A device as defined in claim 13, said shaft being supported on said tank, a pivotal support for said tank, and adjustable means for tilting said tank on said pivotal support.

18. A device as defined in claim 11, said spiral troughs and liquid chambers being disposed one above the other in vertically spaced relation.

19. A device for proportioning a plurality of liquids comprising a supply chamber for each liquid, a rotary inclined spiral trough in each supply chamber for pumping liquid therefrom, said spiral troughs being disposed in coaxial arrangement and rotated by a common coaxial drive shaft, a weir notch in at least one of said spiral troughs arranged to spill a portion of the liquid out of said trough, and means to adjust the inclination of the common axis of said troughs to vary the spillage out of said weir notch.

20. A device for proportioning a mixture of component liquids comprising a pair of concentric cylinders connected at one end to a common end plate, an open top spiral trough on the outside of the outer cylinder, and an open top spiral trough on the outside of the inner cylinder and spaced away from the inside of said outer cylinder whereby the opposite ends of said cylinders and troughs may be immersed in different chambers for the component liquids.

References Cited
UNITED STATES PATENTS

| | | | |
|---|---|---|---|
| 635,504 | 10/1899 | Nowacki | 103—91 |
| 929,224 | 7/1909 | Jeanes | 103—86 |
| 1,142,089 | 6/1915 | Grimes | 103—91 |
| 1,196,696 | 8/1916 | Jones | 103—91 |

MERVIN STEIN, Primary Examiner

U.S. Cl. X.R.

73—215; 103—91; 137—264, 565